United States Patent
Kelem et al.

[19]

[11] Patent Number: 6,118,869
[45] Date of Patent: Sep. 12, 2000

[54] SYSTEM AND METHOD FOR PLD BITSTREAM ENCRYPTION

[75] Inventors: Steven H. Kelem, Los Altos Hills; James L. Burnham, Morgan Hill, both of Calif.

[73] Assignee: Xilinx, Inc., San Jose, Calif.

[21] Appl. No.: 09/038,800

[22] Filed: Mar. 11, 1998

[51] Int. Cl.[7] .......................................... H04L 9/00
[52] U.S. Cl. .................. 380/44; 380/45; 380/46
[58] Field of Search .................. 380/44, 45, 46

[56] References Cited

U.S. PATENT DOCUMENTS

| | | | |
|---|---|---|---|
| 4,202,051 | 5/1980 | Davida et al. | 375/2 |
| 5,365,588 | 11/1994 | Bianco et al. | 380/42 |
| 5,790,666 | 8/1998 | Ooi | 380/20 |
| 5,799,088 | 8/1998 | Raike | 380/30 |

OTHER PUBLICATIONS

Hackett et al, "Build Better Sequential Circuits," ASIC & EDA, pp. 43–45, Mar. 1992.
Bob Hackett, Tom Leach, "Build Better Sequential Circuits", ASIC & EDA, Mar. 1992, pp. 43–45 & 49.

*Primary Examiner*—Tod R. Swann
*Assistant Examiner*—Steve Kabakoff
*Attorney, Agent, or Firm*—Jeanette S. Harms, Esq.; Adam H. Tachner, Esq.

[57] ABSTRACT

A decryption scheme is provided for encrypted configuration bitstreams in a programmable logic device. One embodiment includes circuitry for altering a decryption key for a plurality of encrypted bitstream portions, thereby providing a high level of security of the circuit layout embodied in the bitstream.

21 Claims, 3 Drawing Sheets

SYSTEM AND METHOD FOR PLD BITSTREAM ENCRYPTION

FIELD OF THE INVENTION

The present invention relates generally to programmable logic devices, and more particularly to bitstream encryption for securing programming data in those devices.

BACKGROUND OF THE INVENTION

Programmable logic devices (PLDs) are a well-known type of integrated circuit that may be programmed by a circuit designer to perform user-specified logic functions. One type of PLD, a field programmable gate array (FPGA), typically includes elements such as configurable logic blocks (CLBs), input/output blocks (IOBs), and interconnect that programmably connects the CLBs and IOBs. The configuration of the CLBs, IOBs, and interconnect is determined by a bitstream which is generally stored in an external device including non-volatile memory, such as a PROM, EPROM, ROM, floppy disk, hard disk file, or network. The stored bitstream is loaded into the FPGA either at power-up or during a reconfiguration time after power-up. The FPGA itself may be implemented using volatile or non-volatile memory technology, such as static random access memory (SRAM) technology, thereby facilitating reconfiguration and providing design flexibility.

One limitation of SRAM FPGA devices is that circuit designers risk the theft of their intellectual property (i.e., their proprietary bitstream) by unauthorized persons who copy or reverse-engineer the designer's work product and then, having avoided non-recurring engineering and design costs, undercut the designer's price to customers and end users. Such copying results in significant economic injury to both the circuit designers who have lost the exclusive benefit of their own design efforts, and the FPGA manufacturers, who will likely lose design customers desiring a product less easily copied or reverse-engineered.

One available but fairly limited method of protecting the bitstream is encrypting the bitstream before it is stored in the non-volatile memory, and then decrypting the bitstream inside the FPGA using a factory-programmed, fixed key, hardwired into the device. However, using a key fixed within the FPGA at the factory is problematic if all of the FPGAs have the same key, because the design-copier need only buy a designer's product, copy the encrypted bitstream, and buy an FPGA that has the key that he needs. Then, the product can be replicated with ease on the decrypting devices without breaking the encryption code.

Therefore, a need arises in the art for a system and method for programming FPGAs, while protecting the proprietary data required to program those devices.

SUMMARY OF THE INVENTION

The present invention provides a method and structure for configuring a programmable logic device while making the configuration bitstream unavailable to an unintended person. To provide this security, the method of the present invention includes loading a decrypt key into bitstream decryption circuitry on the device, thereby setting the circuitry to a first state. An encrypted configuration bitstream is then forwarded to the device. After a first portion of the bitstream, in one embodiment a word, is decrypted, the bitstream decryption circuitry is set to a second state. Then, a second portion of the bitstream is decrypted. The programmable logic device is configured using the first and second decrypted portions.

To provide the above-described decryption capability, the present invention comprises a combinational circuit for logically combining the decrypt key and the encrypted bitstream, and a key modification circuit. In one embodiment, the combinational circuit includes a plurality of exclusive-OR logic gates. The key modification circuit modifies the decrypt key for a plurality of bitstream portions. In one embodiment, the key modification circuit includes a linear feedback shift register.

Because the decrypt key is modified on-chip, the present invention decrypts the encrypted bitstream with a decrypt key unavailable outside the device, thereby providing a high level of security for the circuit design embodied in the configuration bitstream.

DETAILED DESCRIPTION OF THE DRAWINGS

In accordance with the present invention, an FPGA configuration bitstream is substantially encrypted, preferably leaving a header and trailer portions of the bitstream unencrypted. A bitstream length indicator, known as a checksum quantity, and a byte count quantity included within the header are then adjusted to reflect the encrypted bitstream contents. At or about the time of encryption, a decryption key is generated. The decryption key is then stored on the target FPGA, and is typically, though not necessarily, stored separately from the device configuration bitstream.

In one embodiment, decryption key storage is implemented using non-volatile memory such as flash memory, low-power memory with battery backup, fuse or anti-fuse programmed memory, EPROM, or PROM. Re-writable, non-volatile storage advantageously allows for the key to be changed or erased at a later date. Irrespective of the technology used for the decryption key, a need to identify and verify the target FPGA as a proper bitstream destination remains. Therefore, in one embodiment, if non-rewritable, non-volatile memory is used, an additional code may be stored on the device for a unique value associated with, but preferably not derived from, the decryption key. In this manner, the additional code may be read as many times as desired without revealing or compromising the decryption key.

In a preferred embodiment, the decryption key can be read only a limited number of times, thereby allowing verification that the key was properly stored in the target FPGA without compromising bitstream security. After verification, read-back is disabled so that unauthorized persons cannot read and copy the key. This limited read back capability can be accomplished through the use of on-chip counters, which are well known to those skilled in the art. Note that read-back disablement preferably does not affect key use for device configuration.

Because the decryption key is derived at the time of bitstream encryption and directly corresponds to the encryption scheme used (for example, one encryption scheme changes the decryption key after a predetermined number of cycles, as explained in detail below), an FPGA having such a decryption key is able to decrypt only those bitstreams that have been encrypted with a matching encryption key. While unencrypted bitstreams or bitstreams encoded with other encryption keys may not be loaded into an FPGA having a particular decryption key, such unencrypted bitstreams and bitstreams encoded with other encryption keys will still be passed through the FPGA as required for, for example, a plurality of FPGAs "daisy-chained" together. Thus, an FPGA having no decryption key will be successfully configured with only an unencrypted bitstream.

Figure 1:
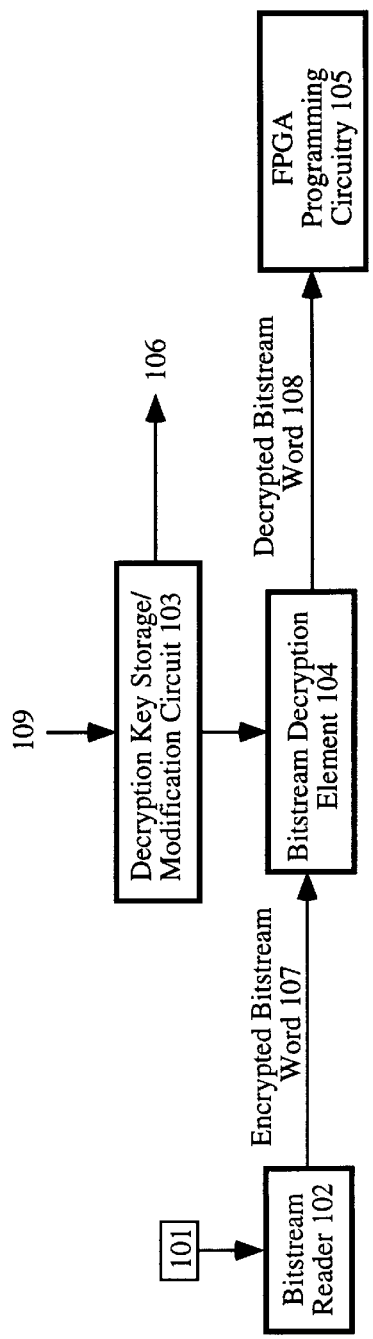
FIG. 1 is a circuit block diagram illustrating one embodiment of the present invention.

FIG. 1 illustrates a block diagram of the present invention implemented on an FPGA. Bitstream reader 102 reads data from an input port 101. In conventional FPGA programming, bitstream reader 102 would forward the bitstream directly to FPGA programming circuitry 105. In contrast, the present invention includes a decryption key storage/modification circuit 103 and a bitstream decryption element 104 (both explained in detail below). Note that decryption key storage/modification circuit 103 and bitstream decryption element 104 function in conjunction with encryption software that encrypts the bitstream before it is forwarded to input port 101, thereby enabling configuration of FPGA programming circuitry 105 with a fully and accurately decrypted bitstream. An initial key and a manner of modifying that key (the encryption scheme) are preferably written to decryption key storage/modification circuit 103 via a line 109, and may be read later via a line 106.

Figure 2:
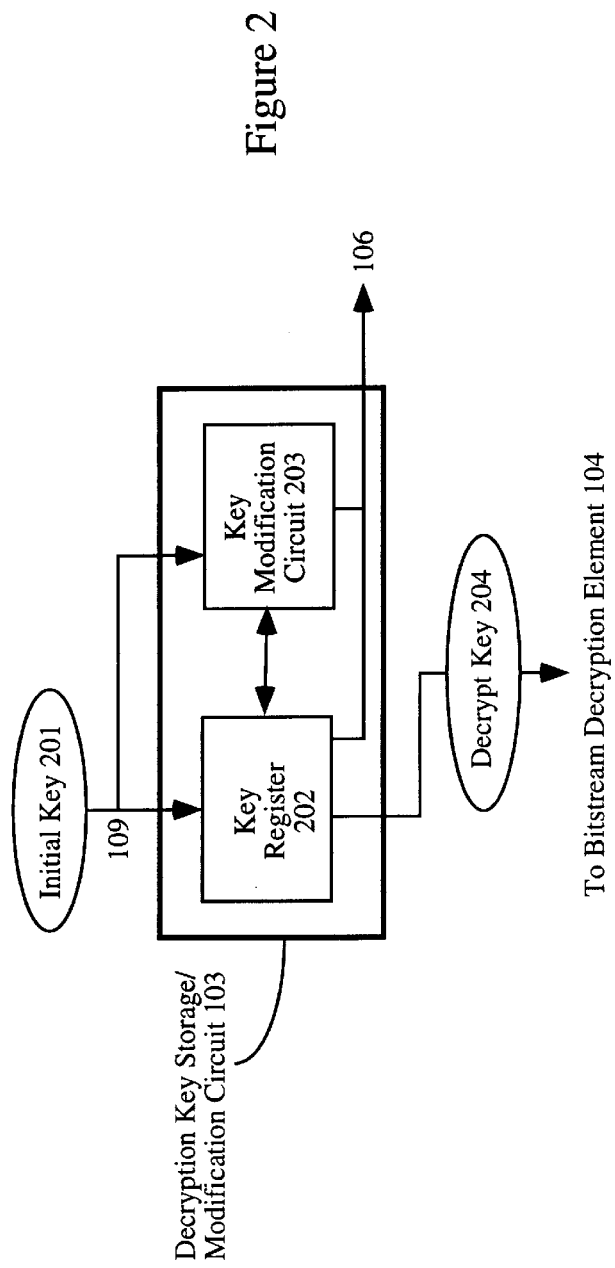
FIG. 2 is a circuit block diagram illustrating a decryption key storage/modification circuit of the present invention.

FIG. 2 illustrates a block diagram of one embodiment of decryption key storage/modification circuit 103. In this embodiment, circuit 103 includes two components: a key register 202 and a key modification circuit 203. After initialization of key register 202, the value of initial key 201 is changed to a new value by key modification circuit 203. In one embodiment, this change is done simultaneously with the arrival of each new encrypted bitstream word 107 (FIG. 1). Referring to FIGS. 1 and 2, bitstream decryption element 104 reads encrypted bitstream word 107 and the current value of key register 202 (a decrypt key 204), and generates a resulting decrypted bitstream word 108.

Figure 3:
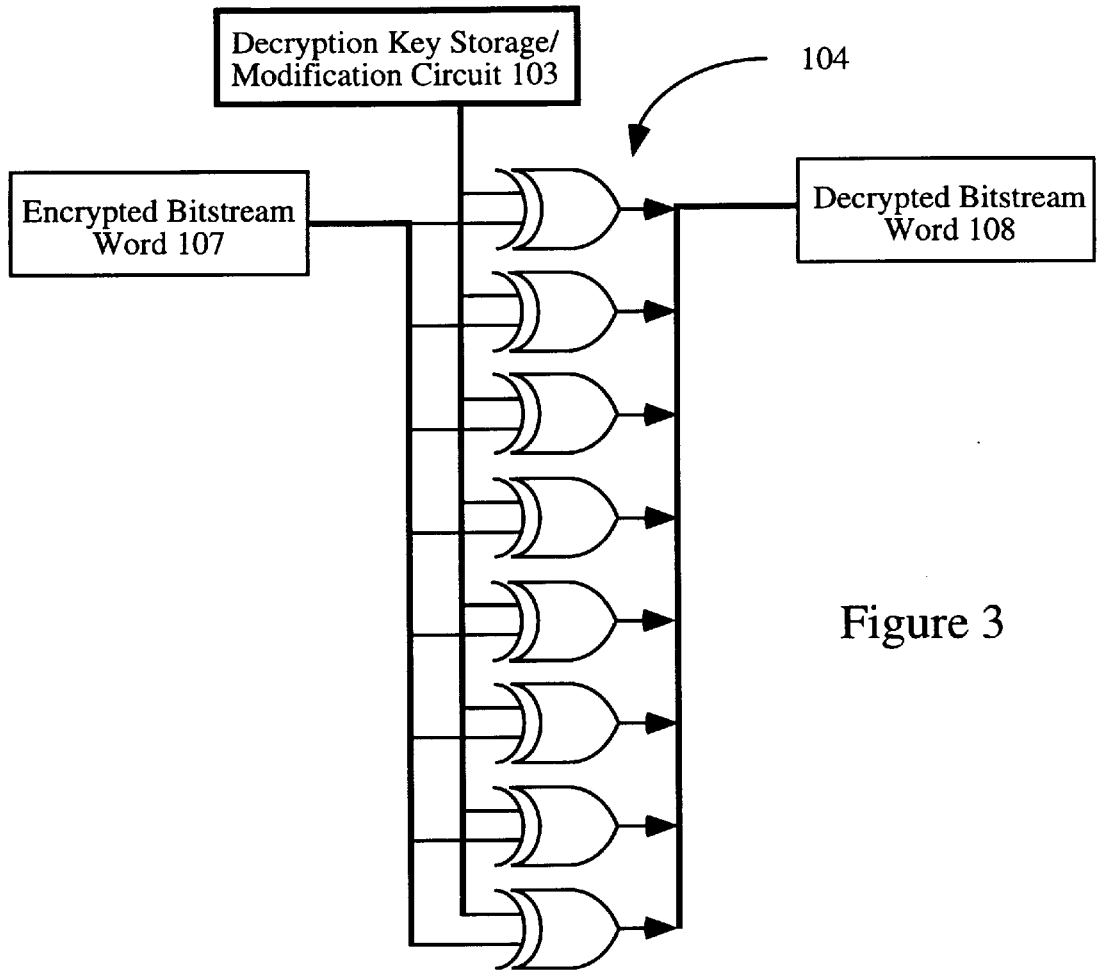
FIG. 3 illustrates one embodiment of the bitstream decryption element of the present invention.

FIG. 3 illustrates one embodiment of bitstream decryption element 104 which includes a plurality of XOR gates, each gate receiving a specific bit of encrypted bitstream word 107 and a specific bit from decryption key storage/modification circuit 103 (decrypt key 204 of FIG. 2). The output signals of the XOR gates form decrypted bitstream word 108. Note that if decrypt key 204 is all zeros, then the output of the XOR gates is the same as encrypted bitstream word 107. Thus, in accordance with the present invention, a decrypt key of all zeros allows unencrypted bitstreams to be used in the target FPGA.

Figure 4:
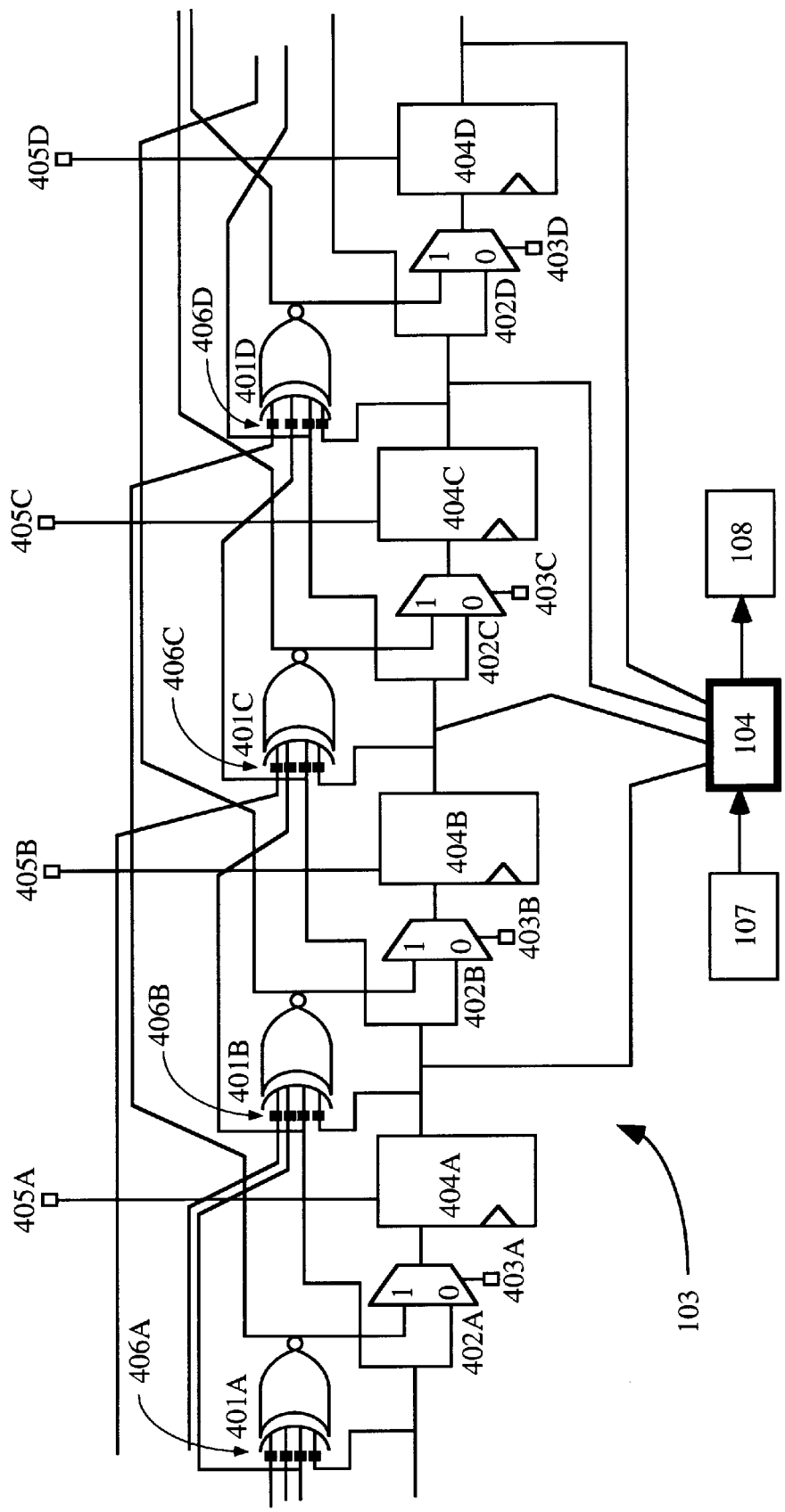
FIG. 4 illustrates one embodiment of the decryption key storage/modification circuit of the present invention.

FIG. 4 shows one embodiment of decryption key storage/modification circuit 103. Note that although illustrative circuit 103 provides only four bits of decrypt key 204 (FIG. 2), any number of bits adequate to hold the desired key length (preferably the same number as encrypted bitstream word 107 (FIG. 1)—commonly 64 bits) may be accommodated.

Circuit 103 is preferably a closed circuit. In other words, after initial key 201 (FIG. 2) is programmed into the target FPGA (explained in detail below), that key is modified with each clock shift (explained in detail below) until, preferably, all or nearly all possible combinations of bits are output to bitstream decryption element 104 and then the sequence is repeated. In this manner, a 64-bit initial key allows for over $10^{19}$ different combinations before repeating. Additional background on circuits having this structure, commonly referred to as linear feedback shift registers (LFSRs), can be found in the article entitled "Build Better Sequential Circuits" by Bob Hackett and Tom Leach, *ASIC & EDA*, March 1992, pp. 43–49, which is incorporated herein by reference.

In this embodiment, decryption key storage/modification circuit 103 includes a plurality of flip-flops 404A–404D connected via multiplexers 402A–402D. Multiplexers 402A–402D are controlled by memory cells 403A–403D, respectively. In accordance with the present invention, the bits of initial key 201 (FIG. 2) are written into memory cells 405A–405D and 403A–403D, and XNOR input selection circuits 406A–406D (explained in detail in reference to FIG. 5). When flip-flops 404 are reset (e.g., at device power-up or upon FPGA initialization), they are set to the value stored in memory cells 405. As mentioned previously, if decryption is not desired, as for unencrypted bitstreams, a key value of 0 is loaded into memory cells 405 and flip-flops 404 are then reset. The signals output by flip-flops 404 form decrypt key 204 which are provided to bitstream decryption element 104.

The first (bottom) input terminals to multiplexers 402 are, with one exception, coupled to the output terminals of the adjacent flip-flops 404 (to the left in FIG. 4). However, in the case of multiplexer 402A, its first input terminal is coupled to the output terminal of the rightmost flip-flop (in this case, flip-flop 404D). Thus, multiplexers 402 and flip-flops 404 are coupled cyclically, thereby allowing the bits to be shifted to the right, as is typically done in an LFSR. The second (top) input terminals of multiplexers 402 are coupled to the output terminals of the adjacent XNOR gates 401. In this manner, each XNOR gate 401 computes the XNOR function of the bits to the left of the current bit, or (because the flip-flops are wired up cyclically) from the rightmost end if this bit is near the left.

Figure 5:
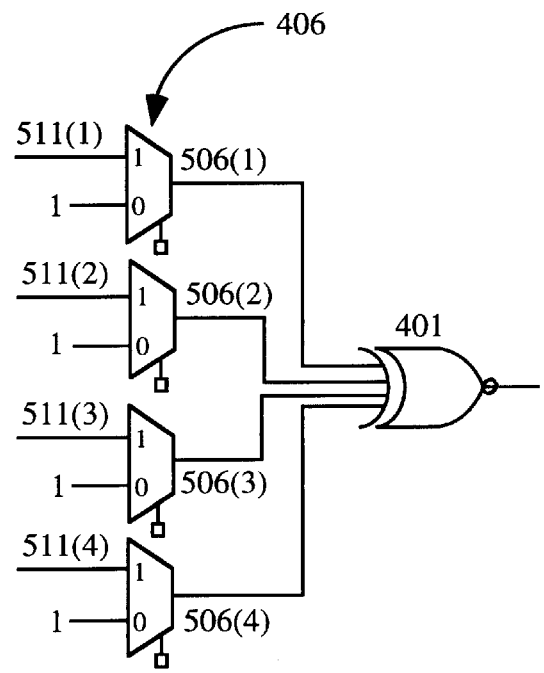
FIG. 5 illustrates one XNOR input element of FIG. 4 in greater detail.

XNOR gates 401 are coupled to input selection circuits 406, each line of such circuit programmably receiving either its respective input signal or with a logic 1. FIG. 5 illustrates one embodiment of XNOR gate 401 and input selection circuit 406. In this embodiment, input selection circuit 406 is implemented using multiplexers 506(1)–506(4). Each input terminal of XNOR gate 401 is coupled to the output terminal of a multiplexer 506 which programmably provides an input signal via line 511 or a logic 1. In accordance with the present invention, if fewer than four input signals are needed, the "unused" input signals are set to logic 1. Multiplexers 506 are controlled via memory cells (typically the same technology used for memory cells 403 and 405).

Referring to FIGS. 4 and 5, the signal on line 511(4) of XNOR gate 401D is provided by adjacent flip-flop 404C or a logic value 1. The signal on line 511(3) is provided by flip-flop 404B, one stage away, or a logic 1. The signal on line 511(2) is provided by flip-flop 404A, two stages away, or a logic 1. Finally, the signal on line 511(1) is provided by XNOR gate 401A, three stages away, or a logic value 1. Note that multiplexers 506(2)–506(4) are used to allow a variable number of signals from adjacent stages, whereas multiplexer 506(1) is used to cascade XNOR signals from previous stages removed from XNOR gate 401 by, in this embodiment, three stages.

In a preferred embodiment of the present invention, decrypt key 204 (FIG. 2) is modified with each encrypted bitstream word 107 (FIG. 1), thereby providing a high level of security. Modification of the decrypt key is accomplished by using the shift and gate (XNOR) features of decryption key storage/modification circuit 103 which is programmable on a bit-by-bit level. A plurality of methods for utilizing the circuitry are described below.

First, multiplexers 402 (FIG. 4) can be set to pass the adjacent bit, thereby modifying the decrypt key forwarded to bitstream decryption element 104 by shifting all bits over one position. For example, setting memory cell 403B to a logic zero causes the output signal of flip-flop 404A to be shifted into flip-flop 404B. Similarly, setting memory cell 403A to a logic zero will cause the output signal of flip-flop 404D to be shifted into flip-flop 404A.

Modification of decrypt key 204 can also be accomplished by XNORing various combinations of the key bits. To load flip-flop 404D with the XNOR of the output signals of flip-flops 404B and 404C, memory cell 403D is set to a logic one, as are the top two memory cells associated with input selection circuit 406D (see FIG. 5). The bottom two memory cells associated with input selection circuit 406D are set to logic zero. Similarly, to XNOR the output signals of flip-flops 404A–404C, memory cell 403D and the bottom three memory cells of input selection circuit 406D are set to logic one.

In yet another example, to provide only the XNOR of the output signals of flip-flops 404C and 404L (not shown, but to the left of flip-flop 404A, thereby providing a register having 5 flip-flops) to flip-flop 404D, set memory cell 403D to a logic 1 and the memory cells associated with input selection circuit 406D (top to bottom) to logic 1,0,0, and 1, respectively. Thus, the output signal of XNOR gate 401D is selected as the input signal to flip-flop 404D, and the output signals of flip-flop 404C and XNOR gate 401A are selected as input signals to XNOR gate 401D. The memory cells associated with multiplexers 506(1)–506(4) in input selection circuit 401A are set to logic 0,0,0,1, respectively, thereby providing the output signal of flip-flop 404L to XNOR gate 401A. The logic 1 input signals provided to XNOR gate 401A (resulting from memory cells of input selection circuit 406A set to logic 0) cause that gate to pass the output signal of flip-flop 404L to the top input terminal of XNOR gate 401D.

Thus, the present invention allows XNOR-modified decryption even if the input bits desired for XNOR combination are not necessarily within three bits of one another. For example, consider the ease of XNORing the output signals of flip-flops 404LL (not shown, but to the left of flip-flop 404L, thereby providing a register having 6 flip-flops), 404L, 404B, and 404C, and providing that function to flip-flop 404D. The XNOR of flip-flops 404LL and 404L can be provided by setting the memory cells of input selection circuit 406A (top to bottom) to 0,0,1,1 (thereby making XNOR gate 401A a 2-input XNOR gate), setting memory cell 403A to logic 1, and setting memory cells of input selection circuit 406D (top to bottom) to logic 1,0,1,1 (thereby making XNOR gate 401D a 3-input XNOR gate).

Other embodiments are contemplated to be within the scope of the present invention. For example, an FPGA could include a counter that alters the decrypt key after a predetermined number of cycles. The number of cycles before the change occurs could be programmed at the factory or by the circuit designer. In one embodiment, the decrypt key changes after a variable number of cycles, the variable number being determined by a down counter connected to a second LFSR. This arrangement would randomize (at the time of encryption) the number of words in the bitstream that are decrypted by the same key. On each clock cycle, the down counter is decremented until it reaches zero, at which time the LFSR is clocked, thereby generating the next pseudo-random number which is loaded into the clock, and the decrypt key is then altered as described above.

Thus, the present invention provides an advantageous method and system for configuring an FPGA using an encrypted bitstream. A general description of the apparatus and method of the present invention as well as a number of illustrative embodiments have been set forth above. One skilled in the art will recognize variations of the present invention. Therefore, the spirit and scope of the invention should be limited only as set forth in the following claims.

What is claimed is:

1. A method of programming a programmable logic device including bitstream decryption circuitry, the method comprising:

loading programming data into the bitstream decryption circuitry, thereby setting the circuitry to a first state;

forwarding an encrypted configuration bitstream to the device;

decrypting a first portion of the bitstream;

setting the bitstream decryption circuitry to a second state;

decrypting a second portion of the bitstream; and configuring the device with the first and second decrypted portions.

2. The method of claim 1 wherein each of the first and second portions is a single word of the bitstream.

3. The method of claim 1 wherein the second state is a linear feedback shift of the first state.

4. A method of decrypting an encrypted bitstream for programming a programmable logic device, the method comprising:

forwarding the encrypted bitstream to the device;

writing a first decryption code to the device;

decrypting a first portion of the bitstream using the first decryption code;

modifying the first decryption code, thereby creating a second decryption code;

decrypting a second portion of the bitstream using the second decryption code; and programming the device with the first and second decrypted portions.

5. A circuit for configuring a programmable logic device with an encrypted bitstream, the circuit comprising:

a combinational circuit for logically combining a decryption key and the encrypted bitstream; and a key modification circuit for modifying and forwarding the decryption key to the combinational circuit, wherein the key modification circuit includes N key modification stages, each stage including:

a first storage device;

a multiplexer having an output terminal connected to an input terminal of the first storage device and a first input terminal connected to an output terminal of a second storage device; and a logic gate having an output terminal connected to a second input terminal of the multiplexer and a first input terminal connected to an output terminal of the second storage device.

6. The circuit of claim 5 wherein said combinational circuit comprises an array of XOR gates.

7. The circuit of claim 5 wherein said key modification circuit comprises a plurality of logic gates programmably coupled to a plurality of flip-flops, wherein the plurality of flip-flops store the decryption key.

8. The circuit of claim 5 wherein the key modification circuit includes a counter.

9. The circuit of claim 8 wherein the counter comprises a linear feedback shift register.

10. A circuit for configuring a programmable logic device, the circuit comprising:

means for forwarding an encrypted configuration bitstream to the device;

means for decrypting the bitstream;

means for modifying a key provided to the means for decrypting; and means for configuring the device with the decrypted bitstream.

11. The circuit of claim 10 wherein the means for decrypting includes a plurality of logic gates for receiving the key and the bitstream.

12. The circuit of claim 10 wherein the means for modifying includes a linear feedback shift register which programmably generates the key.

13. A method of programming a programmable logic device including non-volatile bitstream decryption memory, the method comprising:

loading the memory with decrypting data;

forwarding an encrypted configuration bitstream to the device;

decrypting the encrypted configuration bitstream; and configuring the device with the decrypted bitstream.

14. The method of claim 13 wherein the device includes a decryption counter, the method further comprising:

setting the counter;

decrypting a first portion of the encrypted bitstream while incrementing or decrementing the counter until the counter reaches a predetermined number; and decrypting a second portion of the encrypted bitstream.

15. The method of claim 14 wherein the step of setting precedes all other steps in the method.

16. The method of claim 14 wherein the counter comprises a linear feedback shift register, the register resetting the counter to a pseudo-random value.

17. The circuit of claim 5, wherein the logic gate has N input terminals, and wherein N−1 terminals are connected to output terminals of storage devices in other stages and one terminal is connected to an output terminal of a logic gate in an adjacent stage.

18. The circuit of claim 17, wherein each input terminal of the logic gate includes selection circuitry.

19. The circuit of claim 18, wherein the selection circuitry selectively provides a predetermined signal to the input terminal of the logic gate.

20. The circuit of claim 17, wherein the logic gate is an XNOR gate.

21. The circuit of claim 5, wherein each stage decrypts a bit of an encrypted bitstream word.

* * * * *